(12) United States Patent
Olson et al.

(10) Patent No.: US 11,796,347 B2
(45) Date of Patent: Oct. 24, 2023

(54) SYSTEM AND METHOD FOR PROVIDING FLOW RATE INFORMATION

(71) Applicant: Badger Meter, Inc., Milwaukee, WI (US)

(72) Inventors: John A. Olson, Brookfield, WI (US); Ryan M. Beverung, Germantown, WI (US); Christpher T. Niemuth, Grafton, WI (US)

(73) Assignee: Badger Meter, Inc., Milwaukee, WI (US)

(*) Notice: Subject to any disclaimer, the term of this patent is extended or adjusted under 35 U.S.C. 154(b) by 0 days.

(21) Appl. No.: 17/062,109

(22) Filed: Oct. 2, 2020

(65) Prior Publication Data

US 2022/0107206 A1 Apr. 7, 2022

(51) Int. Cl.
*G01D 4/00* (2006.01)
*G01D 4/02* (2006.01)

(52) U.S. Cl.
CPC ............ *G01D 4/004* (2013.01); *G01D 4/02* (2013.01)

(58) Field of Classification Search
CPC .......... G01D 4/00; G01D 4/02; G01D 4/004; G01D 4/006; G01D 4/008; H04Q 9/00; H04Q 2209/00; H04Q 2209/10; H04Q 2209/40; H04Q 2209/60; H04Q 2209/70; H04Q 2209/80
See application file for complete search history.

(56) References Cited

U.S. PATENT DOCUMENTS

| | | | | |
|---|---|---|---|---|
| 6,657,552 | B2* | 12/2003 | Belski | G01D 4/004 340/870.02 |
| 7,379,791 | B2* | 5/2008 | Tamarkin | G06Q 50/06 700/286 |
| 8,269,650 | B2 | 9/2012 | Cornwall et al. | |
| 9,706,946 | B2 | 7/2017 | Brimer et al. | |
| 9,976,871 | B2* | 5/2018 | Cullinan | G01D 4/008 |
| 2011/0074599 | A1 | 3/2011 | Cornwall et al. | |
| 2011/0074601 | A1 | 3/2011 | Cornwall | |
| 2011/0254696 | A1 | 10/2011 | Cornwall et al. | |
| 2016/0080837 | A1 | 3/2016 | Cornwall et al. | |
| 2020/0196543 | A1* | 6/2020 | Miller | B60K 7/00 |
| 2021/0262839 | A1* | 8/2021 | Collver | G01F 1/115 |

FOREIGN PATENT DOCUMENTS

| | | |
|---|---|---|
| WO | 9004230 | 4/1990 |
| WO | 2006017671 A1 | 2/2006 |

OTHER PUBLICATIONS

The PCT International Search Report and Written Opinion for PCT/US2021/051874, dated Jan. 10, 2022, 11 pages.

* cited by examiner

*Primary Examiner* — Franklin D Balseca
(74) *Attorney, Agent, or Firm* — Boyle Fredrickson, S.C.

(57) ABSTRACT

A utility metering system configured to provide flow rate information is described that includes a utility meter and a utility metering endpoint. The utility meter is configured to generate and report a flow rate as a percentage of the maximum flow rate of the meter.

19 Claims, 3 Drawing Sheets

SYSTEM AND METHOD FOR PROVIDING FLOW RATE INFORMATION

FIELD OF THE INVENTION

This application relates to the field of measurement and monitoring of flow information. More specifically, this application relates to providing flow rate information to a utility using flow rate data from a utility meter for analysis through a smart meter reading system.

BACKGROUND

Utility providers use a network of utility meters located at network endpoints where the utility being provided exits a distribution network and is provided to end users. The flow of the utility being used by the customers or end users is measured at these utility meters and this measurement is then communicated to a network endpoint for transmission to a utility or other data user. Automatic meter reading (AMR) systems, including the utility meters and endpoints, typically read the individual meters and provide the readings through utility meter radio transmitters in the endpoints to communicate with radio or cellular receivers. The receivers also sometimes operate as gateways, collecting meter data from the transmitters and then transmitting the meter data through a second network to a central office. The meter data is transmitted from the receivers or gateways to the central office for processing into customer statements of account.

Utility meters may include any meter for detecting a flow, such as electricity meters, gas meters, water meters, etc. A water meter measures flow data using mechanical wheels, measured pulses, magnetic readings, ultrasonic waves, etc. The measurements are recorded and stored in the meter until transmitted to the endpoint. For example, with AMR, manufacturers have developed pulse or encoder registers to produce electronic output for radio transmitters, reading storage devices, and data logging devices. Encoder registers have an electronic means permitting an external device to interrogate the register to obtain either the position of the wheels or a stored electronic reading. Encoders convert flow data into an electronic format for storage and transmission to AMR/Advanced Metering Infrastructure (AMI)/Advanced Metering Analytics (AMA) endpoints and industrial network systems.

Meters/encoders transmit the flow data to typically co-located endpoints over a wired communication link. Traditionally, the communication link is configured for communication using a 3-wire communication protocol. The endpoints typically provide the received meter data in 15-minute data profiling information over a cellular or other network as received from the meter/encoder. The existing protocol provides information such as current meter reading, meter size and type, temperature, and pressure.

However, utility companies increasingly desire larger amounts of data from water meters, such as providing one-minute profiling interval data as opposed to the 15-minute data profiling interval currently being provided. The increased profiling interval data is used by utilities for determining whether a meter is properly sized. However, increasing transmissions between meter and endpoint is needed to provide the more granular profiling interval data, which can cause difficulties. Providing one-minute profiling interval data dramatically increased the amount of data being transmitted and the associated cost. The increased data will reduce the battery life of both the meter and endpoint.

What is needed is a system and method for providing flow rate data to satisfy the need for increased data without incurring the associated costs. What is further needed is such a system and method configured to facilitate communication between a water meter/encoder and associated endpoint.

SUMMARY OF THE INVENTION

The present invention is directed to a system and method for increasing the efficiency of a meter and endpoint during periodic flow rate reporting for optimizing meter sizing. Advantageously, the inventors of the present have recognized that, although the profiling interval desire for meter sizing is increasing, the granularity of data required is not as high as for tradition flow rate reporting. Accordingly, the present system and method is directed to providing the desired flow rate information while also reducing data transmission overhead.

In one embodiment of the invention, a utility metering system is configured to provide flow rate information is described that includes a utility meter and a utility metering endpoint. The utility meter is configured to generate and report a flow rate percentage that is a percentage of the maximum flow rate for the meter. In one exemplary embodiment, the flow rate percentage consists of two characters, preferably in the ASCII format. In another embodiment, they are a single hexadecimal byte. However, the invention is not limited to these exemplary embodiments.

In one more detailed aspect, the meter communicates to the endpoint using a 3-wire communication interface. In another detailed aspect, the endpoint communicates the percentage flow rate to a head end system.

In another more detailed aspect of the invention, the utility meter is a solid-state meter and/or a solid-state encoder. The utility meter may further be configured to generate flow rate data at a frequency between 1 Hz and 8 Hz.

In another more detailed aspect of the invention, the maximum flow rate of the utility meter is stored in a memory of the utility meter. The percentage of the maximum flow rate may then be transmitted from the utility meter to the utility meter endpoint over the 3-wire communication interface in a standard encoder protocol message. The standard encoder protocol message can be configured to include the percentage of a maximum flow rate is transmitted in response to a periodic request transmitted from the utility metering endpoint. The period of the periodic request may be the industry standard 15-minute period.

In another exemplary embodiment, a utility metering method may be utilized for providing flow rate information between a utility meter and a utility metering endpoint. The method may include aggregating flow rate over a defined time period at the utility meter, and, at the termination of the defined time period, generating a flow rate percentage of the aggregated flow rate in comparison to a maximum flow rate for the utility meter. Thereafter, the method includes transmitting the flow rate percentage to a utility metering endpoint.

In yet another exemplary embodiment, a utility metering system may provide flow rate information using a solid-state utility meter configured to continuously measure flow rate and update an average flow rate over a measuring period and a utility metering endpoint. The utility meter may be configured to periodically generate a flow rate percentage for the measuring period.

Other aspects of the invention, besides those discussed above, will be apparent to those of ordinary skill in the art from the description of exemplary embodiments which follows. In the description, reference is made to the accompanying drawings, which form a part hereof, and which illustrate examples of the invention.

DETAILED DESCRIPTION OF THE INVENTION

Figure 1:
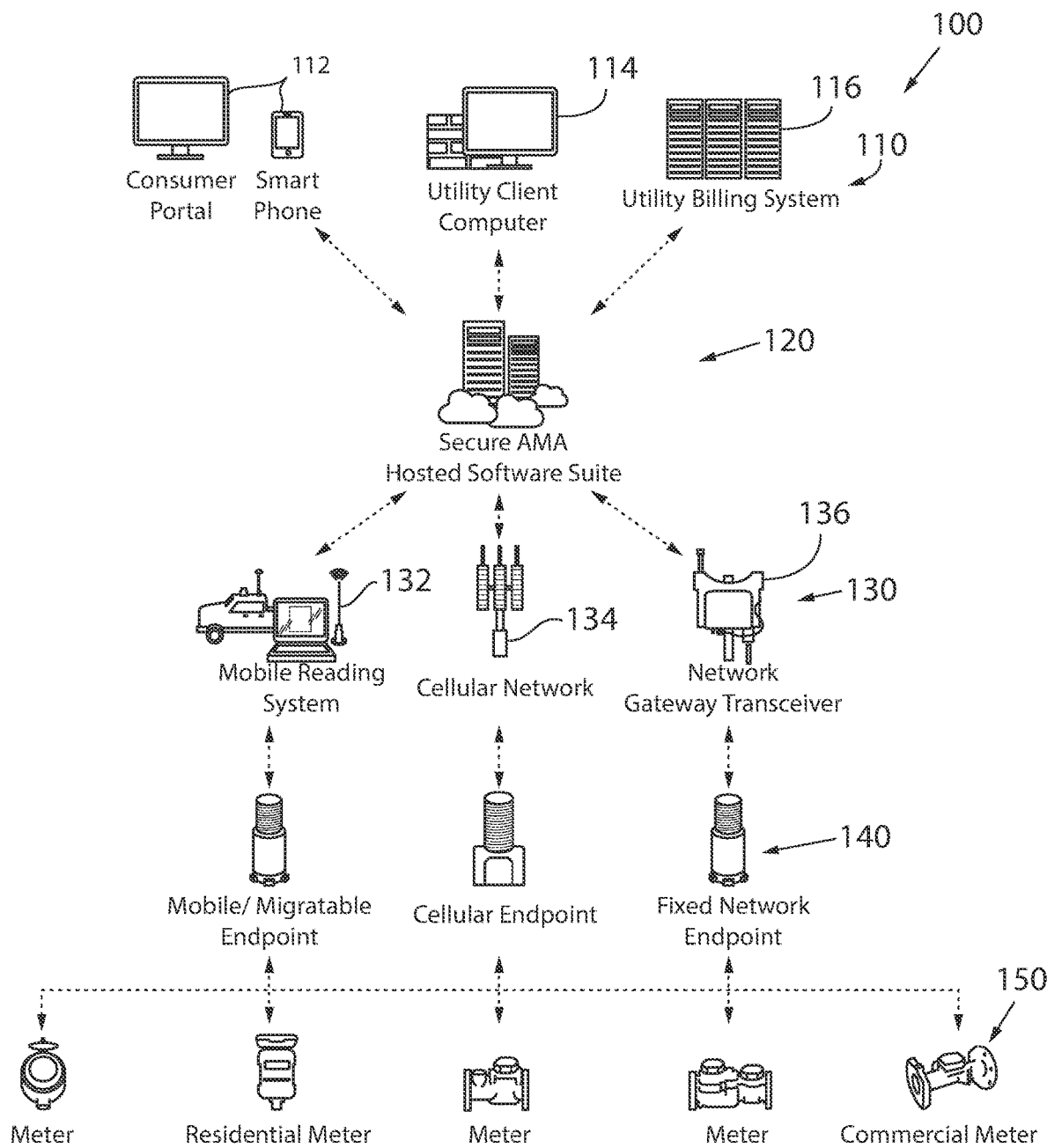
FIG. 1 is a representative diagram of an advanced metering infrastructure (AMI), according to an exemplary embodiment.

Referring first to FIG. 1, a representative diagram of an advanced metering infrastructure (AMI) 100 is shown, according to an exemplary embodiment. AMI 100 is an integrated system of utility data management systems 110, advanced metering analytics system 120, communications networks 130, metering endpoints 140, and utility meters 150 that collectively enable two-way communication between utility providers and utility consumers. AMI 100 provides a number of important functions that were not previously possible or had to be performed manually, such as the ability to automatically and remotely measure utility use, connect and disconnect services, detect tampering, identify and isolate outages and/or leaks, and monitor utility use.

In one exemplary embodiment, utility data management systems 110 may include consumer portal systems 112, utility client computers 114 and utility billing systems 116. Consumer portal systems 112 and utility billing system 116 may be configured for traditional interactions between utility providers and utility consumers. Consumer portal system 112 may be configured to provide utility customers with access to their water consumption data, allowing them to view their usage activity and gain a greater understanding and control of the water they consume. Utility billing systems 116 may be configured to provide traditional billing functions based on utility consumption. Utility client computer systems 114 may be configured to implement system management functions, such as to provide the hosted software platform, system maintenance, software support, and management information.

Advanced metering analytics system 120 is a system and method for aggregating utility data collected over communication networks 130 from endpoints 140 in communication with meters 150. Systems 120 collects meter data for reporting to billing systems 116 and for display through consumer portal systems 112. Systems 120 further cooperate with client computers 114 to collect meter data, associate it with consumer accounts, implement leak detection and shut off functions for particular meters, etc. Systems 120 are considered to be head end systems.

Communications networks 130 may be a mobile network 132, a cellular network 134, a fixed network 136, etc. to communicate the meter data from endpoints 140 to analytics system 120. For example, wherein network 130 is a fixed network, fixed network transceiver assemblies are used, as opposed to mobile transceivers carried in a vehicle or carried by a human employed for mobile networks 132 to collect meter data.

If these transceiver assemblies communicate with a backhaul network, they are known as gateways (to the network). These transceiver units or gateways can be mounted on utility poles, streetlight poles, or on other high structures such as buildings or water storage tank towers or can be placed inside of electric meters or in utility pedestals. Gateways typically have a source of AC power, which can be converted to DC power for operating circuitry in the gateway. Gateways collect the data that is received from a plurality of transceivers 130 at the utility meter data origination sites and pass the data via a second network, sometimes called a backhaul network to system 120. Wireless network 130 can include and/or communicate through various public or private wireless systems operating according to at least one of the following protocols; WIFI (a wireless local area network connected to the Internet), GPRS (a second generation cellular network), POE (Power over Ethernet to the Internet) or CDMA (code division multiple access) and others known in the art.

Metering endpoints 140 can receive data (e.g., messages, commands, etc.) from meters 150 and transmit meter data or other information to the AMA system 120. Although shown as separate devices, in some instances the meter and endpoint can be in the same physical enclosure. Depending on the exact configuration and types of devices used, the endpoint devices 140 transmit standard meter readings either periodically ("bubble-up"), in response to a wake-up signal, or in a combination/hybrid configuration. In each instance, the endpoint devices 140 are configured to exchange data with devices of the AMA system 120.

Utility meters 150 are shown as fixed automatic meter reading system includes a meter and meter register assembly and/or encoder connected in a water line. The assembly includes a meter register and/or encoder. The meter register in the assembly can display units of consumption, using a pulse transmitter to convert the mechanical movements of the meter to electrical signals. An encoder may also be used as a register. In general, an encoder is a device or process that converts data from one format to another and is a device which can detect and convert mechanical motion to an analog or digital coded output signal. Meters 150 may include disc meters, mag meters, ultrasonic meters, etc. to measure the utility flow through the measuring device as recorded by a register/encoder. Hereinbelow, meters 150, each associated with a proximally located encoder, will be referred to as encoders 150 based on their association unless otherwise specified.

Figure 2:
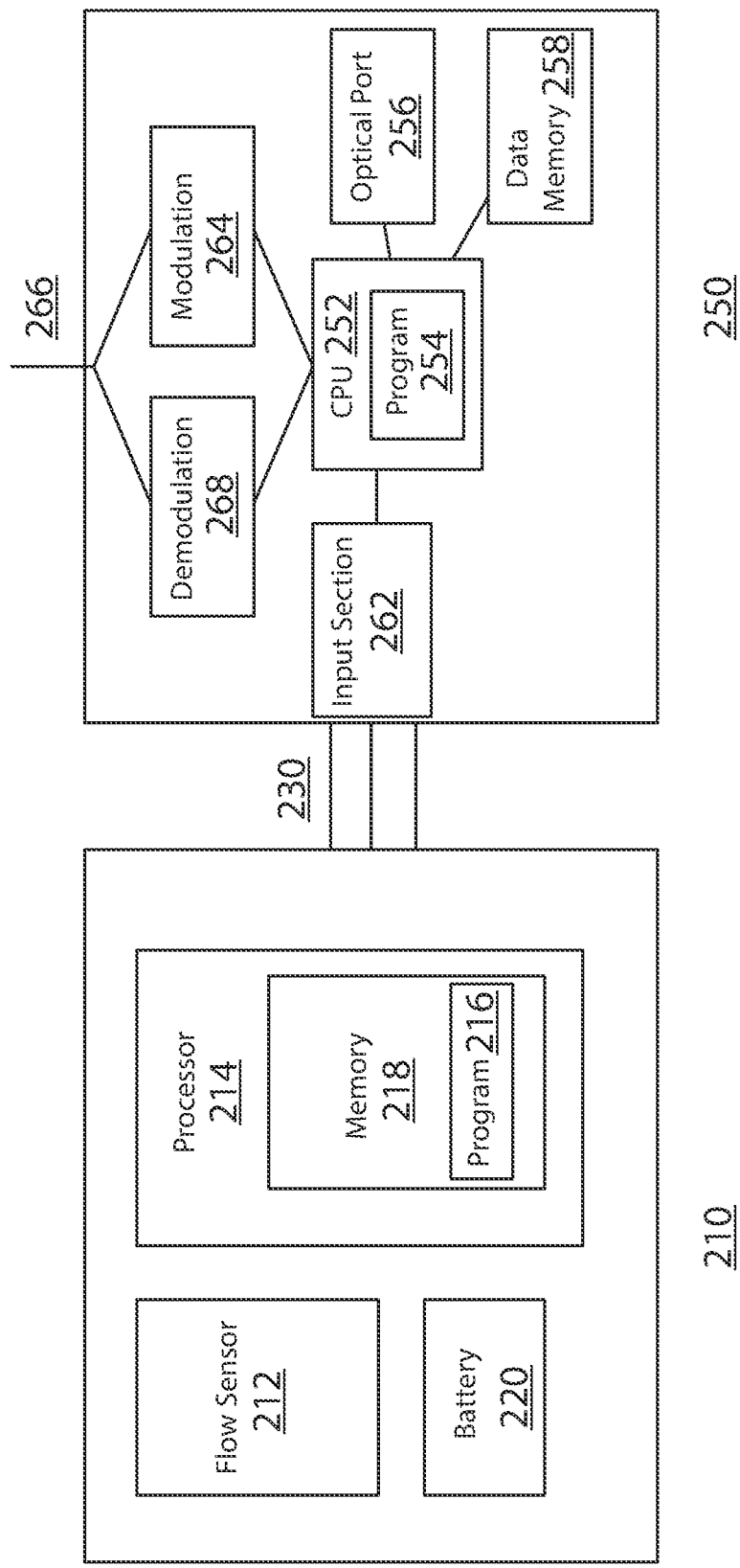
FIG. 2 is a block diagram 200 illustrating a meter and an endpoint connected using a 3-wire encoder cable, according to an exemplary embodiment.

Referring now to FIG. 2, a block diagram 200 illustrating a meter 210 and an endpoint 250 connected using a 3-wire encoder cable 230, is shown, according to an exemplary embodiment. Endpoint 250 is configured to use a 3-wire serial interface protocol to communicate with the meter 210. As previously indicated, in some embodiments, the encoder and endpoint are in the same enclosure, but still may be interconnected by the 3-wire encoder cable 230.

Meter 210 includes a flow sensor 212 configured to measure flow through a conduit (not shown). According to an exemplary embodiment, flow sensor 212 may be a solid-state metering flow sensor such as an ultrasonic or magnetic flow sensor. Sensor 212 measures flow rate repeatedly as part of normal consumption measurement. The typical sampling rate for these solid-state meters ranges from 1 Hz to 8 Hz for most applications. The measured flow input data in provided to a microprocessor system 214 through input(s) from the flow sensor 212.

The specific input data from the flow sensors 212 and the processing of that data within microprocessor system 214 and/or prior to its provision to microprocessor system 214 is dependent on the type of meter 210. For example, for a magnetic meter, electrodes in the conduit provide one or more electromagnetic field sensors which sense an electromagnetic field generated in the fluid due to the velocity of the flow and an applied magnetic field to generate an electromagnetic field output signal. The signal may be conditioned and/or converted and used by microprocessor system 214 to calculate flow velocity. In another example, for an ultrasonic meter, ultrasonic transducers transmit and receive an ultrasonic signal in one or more directions relative to the flow through the conduit. Based on transit time, microprocessor system 214 calculates flow velocity or rate.

Microprocessor system 214 is configured to run a metering program 216 configured to include instruction to perform operations related to flow metering and as described herein. The program 216 may be stored in a memory 216.

Meter 210 includes memory 218, typically non-volatile memory, configured to receive and store flow rate data generated by microprocessor system 214 and program 216. Memory 218 may also store additional information such as data received from additional sensors, data related to the meter, transmission information, etc.

Meter 210 and its associated components are typically powered by a battery 220, particularly where meter 210 is a water or gas meter. Water and gas meters must typically operate from a battery for a minimum lifespan in a wide range of environmental conditions, balancing both energy consumption and the reliability of accurate measurement.

Endpoint 250 includes an electrical circuit typically formed on a circuit board and including a microelectronic CPU 252 operating according to a control program stored in an on-board program memory 254. The program memory 254 is nonvolatile and can be written to over a communication network 130, and with a special programming unit, which communicates with the transceiver through an optical I/O port 256. The CPU 252 typically also utilizes an external RAM memory 258 for temporary storage of historical consumption data.

In operation, meter 210 is configured to routinely monitor flow rate at a high frequency without using a significant amount of battery. Solid state meters are particularly efficient, allowing for the 1 Hz to 8 Hz sampling rate ranges. However, even though the meter 212 may be efficient in measuring the flow rate, communicating those measurements at the same frequency to endpoint 250 requires a relatively large battery use. Since the solid-state meter is routinely monitoring flow rate, it is more efficient to have the solid-state meter monitor and aggregate the flow rate information and not transfer it all to the encoders 140. continuously Periodically, endpoint 250 requests and receives data from meter 210 over the 3-wire interface 230. The data is sent by meter 210 in a standard encoder protocol, such as the industry standard three-wire AMR/AMI interface protocol. The communication is initiated by a clock signal (nominally 0 to 5 volts at 1200 baud) from the endpoint to the encoder along with a pull-up voltage (nominally 3.6 volts) to the data wire. The encoder responds to the clock signal by sending synchronous data back to the endpoint. The message is in a standard ASCII format where the encoder switches data on the falling edge of the clock signal and the endpoint takes the data on the rising edge of the clock signal. The protocol provides information such as current meter reading, maximum flow rate, meter size and type, temperature, and pressure as described in further detail below.

Following the read operation and receipt at the input section 262, the CPU 252 then transmits metering data in a message protocol, which is modulated onto radio frequency (RF) carrier signals by an RF modulation section 264. The RF signals are transmitted through an antenna 266 over communication network 130 to the advanced metering analytics system 120. Radio signals can also be received through the antenna 266 over the communication networks 130 and these signals are demodulated by a demodulation section 268 to extract data from the RF carrier signals for processing by the CPU 252. This data can include commands and configuration data for operation of the endpoint 250 and/or for transmission to a meter/encoder 210.

In another exemplary embodiment, a meter, register, and endpoint are collocated such that there is no wired connection, three wire or otherwise, between the meter 210 and endpoint 250. In this embodiment, a microcontroller controls the flow rate interval, nominally every 15 minutes, and directly communicates the percentages over an RF link.

Figure 3:
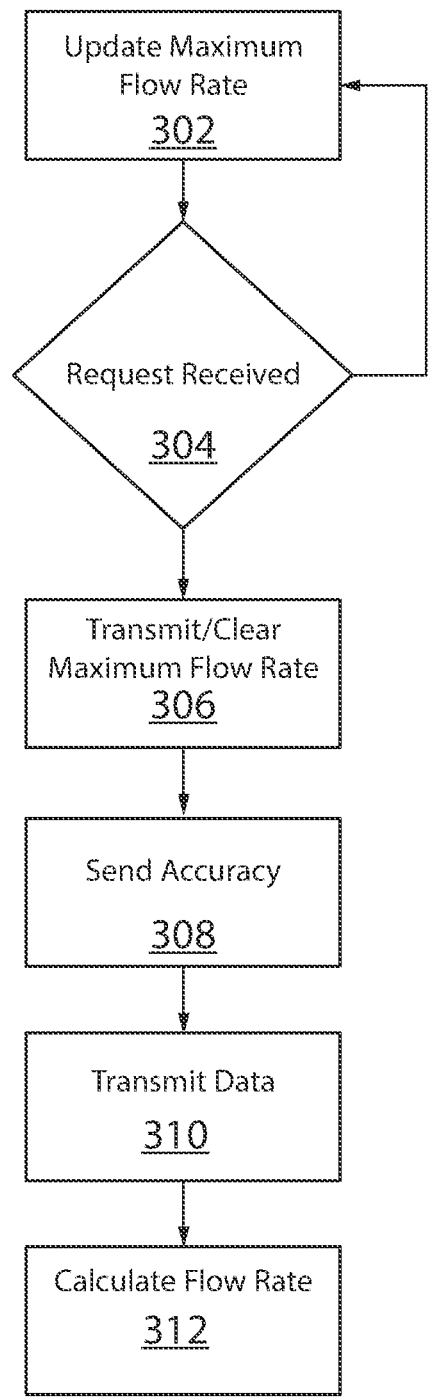
FIG. 3 is a flowchart illustrating a method for providing flow rate information to a utility using flow rate data from a utility meter for analysis through a smart meter reading system, according to an exemplary embodiment.

Referring now to FIG. 3, a flowchart 300 illustrates a method for providing flow rate information to a utility using flow rate data from a utility meter for analysis through a smart meter reading system, according to an exemplary embodiment. The method configures meter 210 to monitor and record the maximum flow rate of the meter 210 between readings from endpoint 250. In a step 302, meter 210 generates new flow rate data based on data detected by flow sensors 212. The generated flow rate is compared to a maximum flow rate stored in memory 218. The maximum flow rate is the maximum flow rate that has been generated since the last transmission of a standard encoder protocol message between meter 210 and endpoint 250. If the generated flow rate is greater than the stored maximum flow rate, the stored maximum flow rate is updated to be the generated flow rate.

In a step 304, a determination is made whether the meter 210 has received a request for a standard encoder protocol message. In a preferred embodiment, the reading interval for endpoint 250 is set to be every 15 minutes. Upon expiration of the interval, the endpoint 250 transmits the request for a standard encoder protocol message to receive the maximum flow rate data from the meter 210, among other data as described above. The maximum flow rate is sent as part of the standard encoder protocol as an ASCII representation between 0 to 99 described as follows.

In a step 306, meter 210 clears the stored maximum flow rate and then starts a new interval of recording the maximum flow rate. If there is no measured flow between any two reads by endpoint 250, meter 210 will represent the maximum flow rate as zero for that interval.

In a step 308, meter 210 sends the flow rate represented as the percentage of a maximum flow for a specific meter size. In the exemplary embodiment, the encoder in meter 210 is configured to have stored in memory its meter size and corresponding maximum flow rate to calculate a percentage of maximum flow ranging from 0% to 99%. Advantageously, limiting the data transmitted to a value between 0 and 99 saves data. For example, a small residential meter has flow rates between 0.01 GPM and 20 GPM. A utility may also utilize a different unit of measure at the meter for flow rate. The same small meter in $m^3/h$ would have a range of 0.0022 to 4.54 $m^3/h$. A larger meter may have flow rates exceeding 20,000 GPM. Limiting the flow rate as a percentage limits the amount of data to two ASCII rather than needing to convey a wide range of numeric representations that would need to include a decimal location and flow rate unit of measure. The flow rate percentage still conveys the desired information for meter sizing. Furthermore, since the meter size is transmitted as part of the ASCII message, the flow rate can be recreated from the percentage at the head end system in any flow rate units desired by the customer.

Accordingly, the described method provides flow rate information necessary for meter sizing and system monitoring while also reducing the amount of data transmitted between the endpoint and the head end system. Sending as a percentage allows the flow rate to be sent using only two ASCII characters. With the meter sizes and units of measure previously indicated, ten ASCII characters would otherwise have been required represent a range of 00000.0022 m3/h to 20000.0000 GPM.

In a step 310, endpoint 250, as part of its normal reporting of 15-minute interval data, transmits the flow rate percentage value. Endpoint 250 transmits the interval data to analytics system 120, a head end system. The endpoint 250 periodically reports the aggregated flow rate percentages to the head end system. This information is collected at the reading interval of the endpoint 250 and would typically be transmitted to the head end system ranging from once to several times per day. The endpoint 250 similarly conveys the flow rate as a percentage of maximum flow but typically would be transmitted in a format more conducive for an RF transmission. Typically, the flow rate percentage would be sent as one byte of hex data for each interval.

In a step 312, advanced metering analytics system 120 determines the flow rate based on the transmitted flow rate percentage value. As previously described, the standard encoder protocol identifies the meter size and type. System 120 can then identify the flow rate to a resolution necessary for meter sizing and system monitoring. As an example, for an E25 meter, the maximum flow rate is 25 GPM. A flow rate percentage of 50% therefore indicates 12.5 GPM while the next increment of 51% indicates 12.75 GPM. System 120 aggregates the data in the normal reporting and converts it back to actual flow rates since the associated meter size is known. A water utility system 110 could then use this information for meter sizing or to provide other alerts and notifications.

For example, the intent of meter sizing is to use the smallest size of meter necessary based on the usage profile at a given site. A smaller meter of a given type is going to be more efficient in cost while simultaneously providing more accurate measurement at lower flow rates. The meter sizing may be based at least is part on the flow rate percentage value. For example, a meter that is experiencing flow at 90% of the maximum flow is a candidate for a larger meter. In contrast, a meter that never experiences flow above 50% of the maximum flow is a candidate for a smaller meter.

Analytics of flow rate data can also be used to notify a utility of specific usage patterns and conditions. For example, a high flow rate during a duration of time can be an indication of irrigation. This indication may be useful if a given location has watering restrictions or limits irrigation to certain times of the day or particular days of the week. In another example, a residential meter that never reports a zero-flow rate may indicate that there is a leak at the property associated with the residential meter. In a further embodiment of the invention, the endpoint periodically reports the aggregated flow rate percentages to the head end system. This information is collected at the reading interval of the endpoint and would typically be transmitted to the head end system ranging from once to several times per day.

Advantageously, the described system and method addresses the one-minute profiling data desired by utilities. The system and method aggregate data at the meter encoder before sending it to the head end system. Rather than send flow rate for each 1 minute interval, the encoder can continuously monitor the flow rate and convey the maximum flow rate of the meter at 15 minute or hourly intervals to convey the same information necessary for meter sizing.

This has been a description of exemplary embodiments, but it will be apparent to those of ordinary skill in the art that variations may be made in the details of these specific embodiments without departing from the scope and spirit of the present invention, and that such variations are intended to be encompassed by the following claims.

We claim:

1. A utility metering system configured to provide flow rate information, comprising:
   a utility meter including a flow sensor and a meter processor; and
   a utility metering endpoint in communication with the utility meter through a 3-wire encoder cable using a 3-wire serial interface protocol,
   wherein the meter processor of the utility meter is configured to generate and report a flow rate as a percentage of a maximum flow rate of the meter to an encoder processor of the utility meter endpoint through the 3-wire encoder cable using the 3-wire serial interface protocol,
   further wherein generating and reporting the flow rate as the percentage of the maximum flow rate of the meter includes aggregating flow rate over a defined time period at the utility meter using the flow sensor and the meter processor and configuring the meter processor to generate the flow rate percentage as the percentage of the maximum flow rate of the meter.

2. The utility metering system of claim 1, wherein the utility metering endpoint communicates the percentage flow rate to a head end system.

3. The utility metering system of claim 1, wherein the utility meter is at least one of a solid-state meter and a solid-state encoder.

4. The utility metering system of claim 3, wherein the utility meter is configured to generate flow rate data at a frequency between 1 Hz and 8 Hz.

5. The utility metering system of claim 1, wherein the maximum flow rate of the utility meter is a value stored in a memory of the utility meter.

6. The utility metering system of claim 5, wherein the percentage of the maximum flow rate is transmitted from the utility meter to the utility metering endpoint over the 3-wire encoder cable in a standard encoder protocol message.

7. The utility metering system of claim 6, wherein the standard encoder protocol message including the percentage of the maximum flow rate is transmitted in response to a periodic request transmitted from the utility metering endpoint.

8. The utility metering system of claim 7, wherein a period of the periodic request is 15 minutes.

9. A utility metering method for providing flow rate information between a utility meter and a utility metering endpoint, comprising:
   aggregating flow rate over a defined time period at the utility meter using a flow sensor and a meter processor;
   at a termination of the defined time period, configuring the meter processor to generate a flow rate percentage of the aggregated flow rate in comparison to a maximum flow rate for the utility meter; and transmitting the flow rate percentage from the meter processor to an endpoint processor of the utility metering endpoint through a 3-wire encoder cable using a 3-wire serial interface protocol.

10. The utility metering method of claim 9, wherein the utility meter is at least one of a solid-state meter and a solid-state encoder.

11. The utility metering method of claim 9, wherein the endpoint communicates the percentage flow rate to the head end system.

12. The utility metering method of claim 9, wherein the utility meter is configured to generate flow rate data at a frequency between 1 Hz and 8 Hz.

13. The utility metering method of claim 9, wherein the maximum flow rate of the utility meter is a value stored in a memory of the utility meter.

14. The utility metering method of claim 9, wherein the flow rate percentage is transmitted from the utility meter to the utility metering endpoint over a 3-wire communication interface in a standard encoder protocol message.

15. The utility metering method of claim 14, wherein the standard encoder protocol message including the flow rate percentage is transmitted in response to a periodic request transmitted from the utility metering endpoint.

16. A utility metering system configured to provide flow rate information, comprising:

a solid-state utility meter including a flow sensor and a meter processor configured to continuously measure flow rate and update an average flow rate over a measuring period; and a utility metering endpoint in communication with the utility meter through a 3-wire encoder cable using a 3-wire serial interface protocol, wherein the meter processor of the utility meter is configured to periodically generate a flow rate percentage for the measuring period by aggregating flow rate over the measuring period at the utility meter using the flow sensor and the meter processor and configuring the meter processor to generate the flow rate percentage as a percentage of a maximum flow rate of the meter for communication to the utility metering endpoint to an encoder processor of the utility metering endpoint through the 3-wire encoder cable using the 3-wire serial interface protocol.

17. The utility metering system of claim 16, wherein the utility metering endpoint communicates the percentage flow rate to a head end system.

18. The utility metering system of claim 16, wherein the flow rate percentage is the percentage of the maximum flow rate for the utility meter, a value stored in a memory of the utility meter.

19. The utility metering system of claim 16, wherein the percentage of the maximum flow rate is transmitted from the utility meter to the utility metering endpoint over the 3-wire encoder cable in a standard encoder protocol message.

* * * * *